March 3, 1970   D. R. BURROWS ET AL   3,498,725
REFLEX SIGHTING DEVICE INCLUDING A PARTIAL REFLECTOR AND MEANS
BETWEEN THE REFLECTOR AND DISPLAY TO COMPENSATE FOR PARALLAX
Filed March 18, 1965   3 Sheets-Sheet 1

INVENTORS:—
Derek Raymond Burrows and
Fritz Peter Heller,
By:— Smith, Michael, Bradford & Gardiner,
ATTORNEYS.

March 3, 1970 D. R. BURROWS ET AL 3,498,725
REFLEX SIGHTING DEVICE INCLUDING A PARTIAL REFLECTOR AND MEANS
BETWEEN THE REFLECTOR AND DISPLAY TO COMPENSATE FOR PARALLAX
Filed March 18, 1965 3 Sheets-Sheet 2

INVENTORS:-
Derek Raymond Burrows &
Fritz Peter Weller,
By:- Smith, Michael, Bradford & Gardiner,
ATTORNEYS.

March 3, 1970   D. R. BURROWS ET AL   3,498,725
REFLEX SIGHTING DEVICE INCLUDING A PARTIAL REFLECTOR AND MEANS
BETWEEN THE REFLECTOR AND DISPLAY TO COMPENSATE FOR PARALLAX
Filed March 18, 1965   3 Sheets-Sheet 3 ent Office 3,498,725
Patented Mar. 3, 1970

3,498,725
REFLEX SIGHTING DEVICE INCLUDING A PARTIAL REFLECTOR AND MEANS BETWEEN THE REFLECTOR AND DISPLAY TO COMPENSATE FOR PARALLAX
Derek R. Burrows and Fritz P. Heller, London, England, assignors to Elliott Brothers (London) Limited, London, England, a British company
Filed Mar. 18, 1965, Ser. No. 440,739
Claims priority, application Great Britain, Mar. 20, 1964, 11,863/64
Int. Cl. G02b 23/10
U.S. Cl. 356—251
2 Claims

ABSTRACT OF THE DISCLOSURE

Apparatus for superimposing an image of a display on a distant scene, which scene is viewed by an observer through a window having a component of curvature in one plane, comprising a partial reflector disposed in the path of light from the scene to the observer and operative to reflect light from the display to the observer, and an optical element disposed between the window and the partial reflector, or between the display and the partial reflector which is effective to compensate for parallax distortion introduced by the window.

---

This invention relates to apparatus for forming an image of a display at the same distance as, and superimposed upon, a distant scene.

In apparatus currently employed to assist the pilots of aircraft, a display simulating certain features of a scene visible to the pilot through the windscreen of the aircraft is optically superimposed upon the actual scene so that both scene and display are viewed simultaneously by the pilot. It is found in practice that certain disadvantages arise from the necessarily curved form of the windscreen and it is an object of the invention to reduce or overcome these disadvantages.

According to the present invention there is provided apparatus for forming an image of a display at the same distance as, and superimposed upon, a distant scene, which scene is viewed by an observer through a transparent member having a component of curvature in one plane which renders the apparent distance of at least parts of the scene less than its true distance, said apparatus comprising an optical element which is disposed in the path of light from the scene or from the display and is so curved as to render the display image and the whole of said scene at substantially the same apparent distance from the observer.

The optical effect of a transparent member having a component of curvature in one plane is to reduce the apparent distance of the scene if viewed by two eyes in the plane of curvature but to leave it unchanged if the two eyes are in a plane at right angles to the plane of curvature of the transparent member. Accordingly said apparatus comprises an optical element in the path of the light from the display which is so curved as to give the display the same optical properties as regards apparent distance as the scene receives from the transparent member. Alternatively, said apparatus inserts an optical element in the path of the light from the scene which cancels out the effect of the curved transparent member and restores the apparent distance uniformly to infinity.

Further according to the present invention there is provided an optical apparatus for causing the image of a display to appear to an observer in apparent superposition upon a scene viewed by said observer through a window having a horizontal cylindrical component of curvature, comprising an optical component lying in the optical path from said display or from said scene to said observer which exhibits cylindrical curvature of such kind and amount as to compensate at least in part for parallax distortion introduced by the curvature of said window.

Still further according to the present invention there is provided apparatus for superimposing an image of a display on a distant scene, which scene is viewed by an observer through a window having a component of curvature in one plane, comprising a partial reflector disposed in the path of light from the scene to the observer and operative to reflect light from the display to the observer, the partial reflector having such a component of curvature as to compensate parallax distortion introduced by the window.

Yet further according to the present invention there is provided apparatus for superimposing an image of a display on a distant scene, which scene is viewed by an observer through a window having a component of curvature in one plane, comprising a partial reflector disposed in the path of light from the scene to the observer and operative to reflect light from the display to the observer, and an optical element disposed between the window and the partial reflector, or between the display and the partial reflector which is effective to compensate for parallax distortion introduced by the window.

Certain embodiments of optical apparatus in accordance with the invention will now be described, by way of example, with reference to the accompanying diagrammatic drawings, in which.

Figure 1:
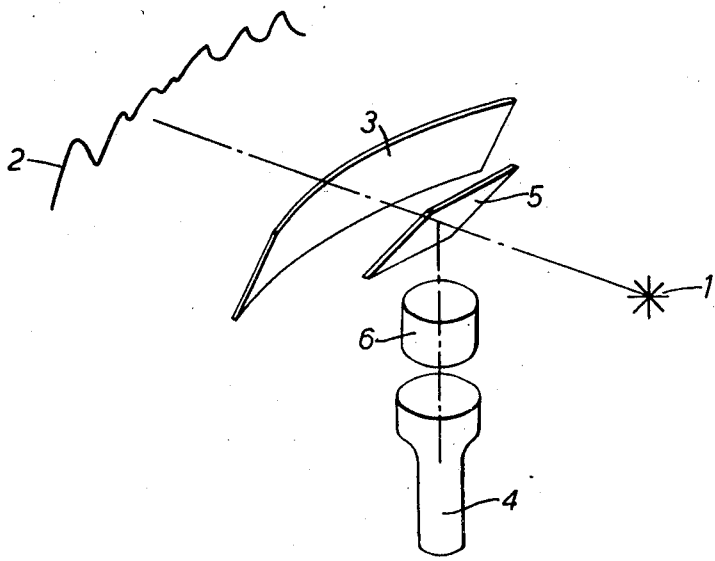
FIGURE 1 is a perspective diagram illustrating one form of apparatus to which the invention may be applied.

In FIGURE 1 an observer, indicated by an asterisk 1, views an actual scene represented by a serpentine line 2 through a window or other transparent member 3 having a component of curvature for example cylindrical in a horizontal plane. A luminous display produced upon the screen of a cathode ray tube 4 is made visible to the observer 1 in apparent superposition upon the scene 2 by reflection in a partial or semi-reflector 5 interposed between the observer 1 and the window 3. A lens system 6 interposed between the cathode ray tube 4 and the semi-reflector 5 is so constructed that light travelling from the screen of the cathode ray tube 4 is collimated, that is, so that the luminous display appears to the observer 1 as being at infinity.

It is found that the presence of the curved window 3 in the optical path from the observer 1 to the scene 2 results in an apparent reduction in the distance of the scene 2 from the observer 1, so that parallax now appears between the display, imaged at infinity, and the scene 2, now apparently less distant.

Figure 2:
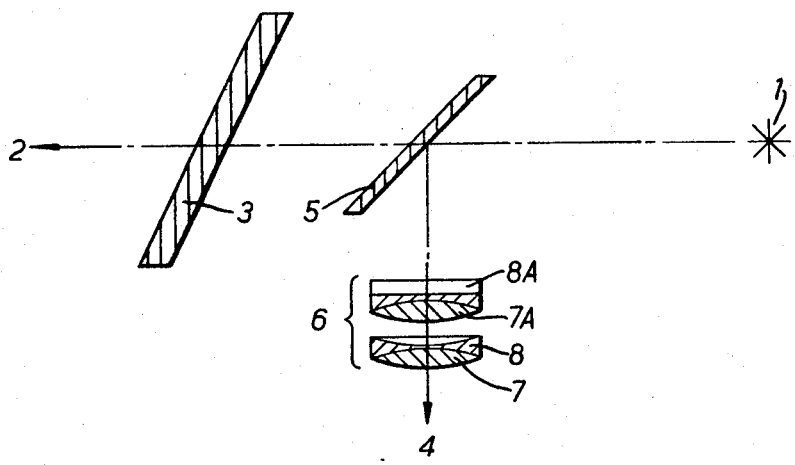
FIGURES 2 and 3 are respectively side and end views, partially in section, of one embodiment.
Figure 3:
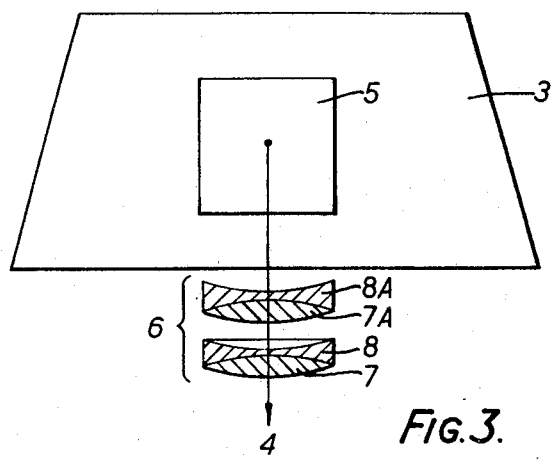

In the embodiment illustrated in FIGURES 2 and 3, the lens system 6 of FIGURE 1 comprises two doublets. The doublet nearer the cathode ray tube 4 (not shown in these figures) comprises positive and negative axially symmetric components, 7, 8, while that nearer the reflector 5 comprises a positive axially symmetric component 7A and a negative component 8A of which, as will be seen, the upper surface is cylindrically formed. The component 8A serves to compensate for the defocussing effect of the window in the horizontal plane. Suitable choice of the powers of the various lens components will ensure that the horizontal curvature of the window 3 is at least partially compensated. In other words, the lens system serves to change the apparent distance of the display from the observer. If desired, the powers of the lens components can be chosen to cause a display at a finite distance from the observer to appear in apparent coincidence with a scene optically at infinity.

Figure 4:
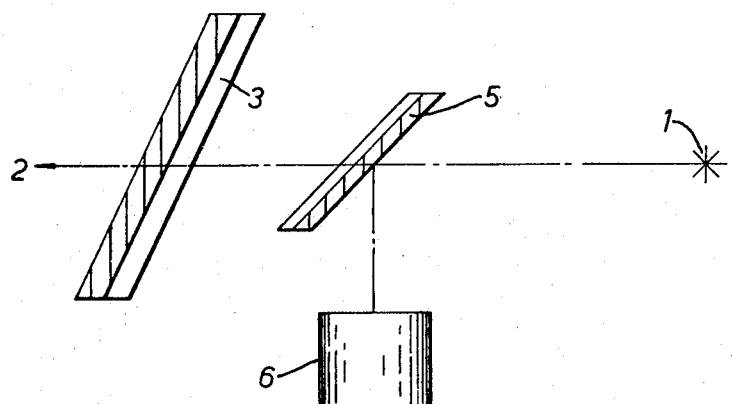
FIGURES 4 and 5 are respectively a side view, partially in section, and a plan of another embodiment.
Figure 5:
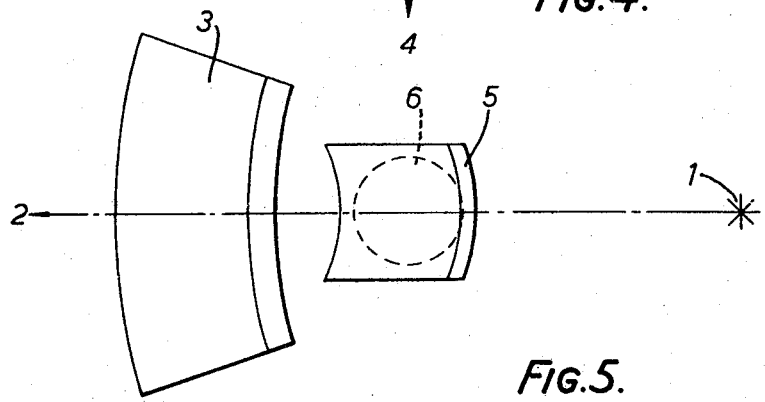

In an alternative embodiment illustrated in FIGURES 4 and 5, the lens system 6 is such as to produce an image of the display at infinity and the reflector 5 is curved in a horizontal plane in the opposite sense to the curvature of the window 3, the amount of curvature being preferably such as substantially to compensate for that of the window as regards parallax.

Figure 6:
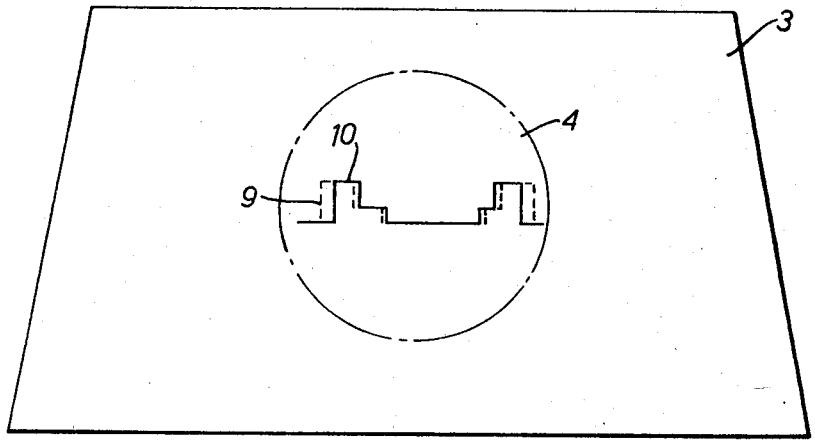
FIGURE 6 is a diagram illustrating the effect of a modification of the invention in reducing scale error.

FIGURE 6 illustrates the scale error distortion which may result from the use of a curved window. Here the negative lens effect of the horizontally curved window 3 is such as to alter the actual width of a terrain feature represented by a broken line 9 to the apparent width shown by a solid line 10. Thus, a display optically removed to infinity which is correctly scaled to the true terrain will follow the broken line 9 and will not match the terrain as viewed, though its effective distance may be matched by the use of the invention. In accordance with a modification of the invention an alteration is made in the horizontal deflection sensitivity of the cathode ray tube upon which the display is produced and this alteration in sensitivity is such that the display becomes of the same width as the apparent terrain feature.

Figure 7:
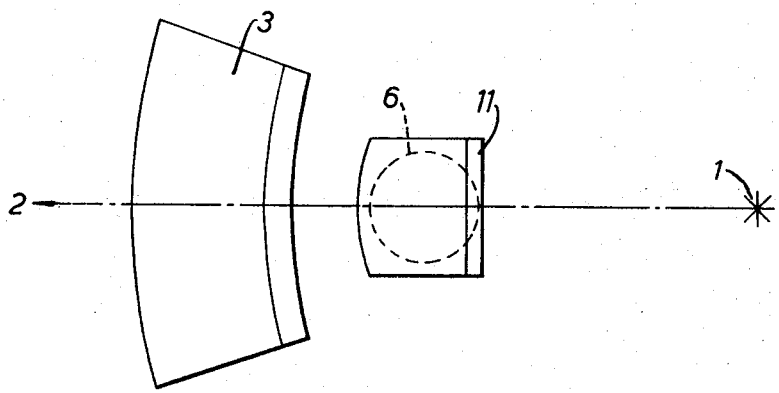
FIGURE 7 is a plan of a further embodiment.

The embodiment illustrated in FIGURE 7 is generally the same as that of FIGURES 4 and 5, but the semireflector 11 is convex like the window 3 on the face directed towards the window and is plane on the face directed towards the observer.

In an illustrated modification of the embodiment of FIGURES 2 and 3 the lens system is so constructed as to cause the display to appear to the observer as being at the apparent distance of the scene, this distance being reduced from the true, optically infinite, distance to an apparent optically finite distance by the effect of the curvature of the window. In this modification a cylindrical optical element active in the vertical plane and of positive curvature is used to adjust the optical system in the vertical plane in which the window has no optical effect.

Although the present invention has been described with reference to windows having a component of curvature in a horizontal plane, it is clearly equally applicable to optical apparatus in which vertically curved windows are employed. Further the lens system of FIGURES 2 and 3 can be interposed between the window and the partial reflector instead of between the cathode ray tube screen and the partial reflector.

We claim:

1. In optical apparatus for causing the image of a display to appear to an observer by means including a partial reflector in apparent superposition upon a scene viewed by said observer through a window having a horizontal cylindrical component of curvature, said partial reflector being disposed between the window and the observer, the improvement comprising an optical component lying in the optical path of light from said display to said partial reflector which component exhibits cylindrical curvature of such kind and amount as to compensate at least in part for parallax distortion by the curvature of said window.

2. In apparatus for superimposing an image of a display on a distant scene, which scene is viewed by an observer through a window having a component of curvature in one plane, comprising a planar partial reflector disposed in the path of light from the scene to the observer, disposed between the window and the observer, and disposed to reflect light from the display to the observer, the improvement comprising an optical element disposed between the display and the partial reflector, said element being so disposed and having the function to compensate for parallax distortion introduced by the window.

References Cited

UNITED STATES PATENTS

| 3,230,819 | 1/1966 | Noxon | 350—174 |
| 2,384,540 | 9/1945 | Flint | 350—319 |
| 2,459,206 | 1/1949 | Wheeler. | |
| 2,490,747 | 12/1949 | Creighton. | |
| 2,588,035 | 3/1952 | O'Neil. | |
| 2,949,808 | 8/1960 | Thurow. | |
| 3,211,045 | 10/1965 | Gerhardt. | |

JEWELL H. PEDERSON, Primary Examiner

O. B. CHEW II, Assistant Examiner

U.S. Cl. X.R.

350—174